United States Patent Office 2,767,476
Patented Oct. 23, 1956

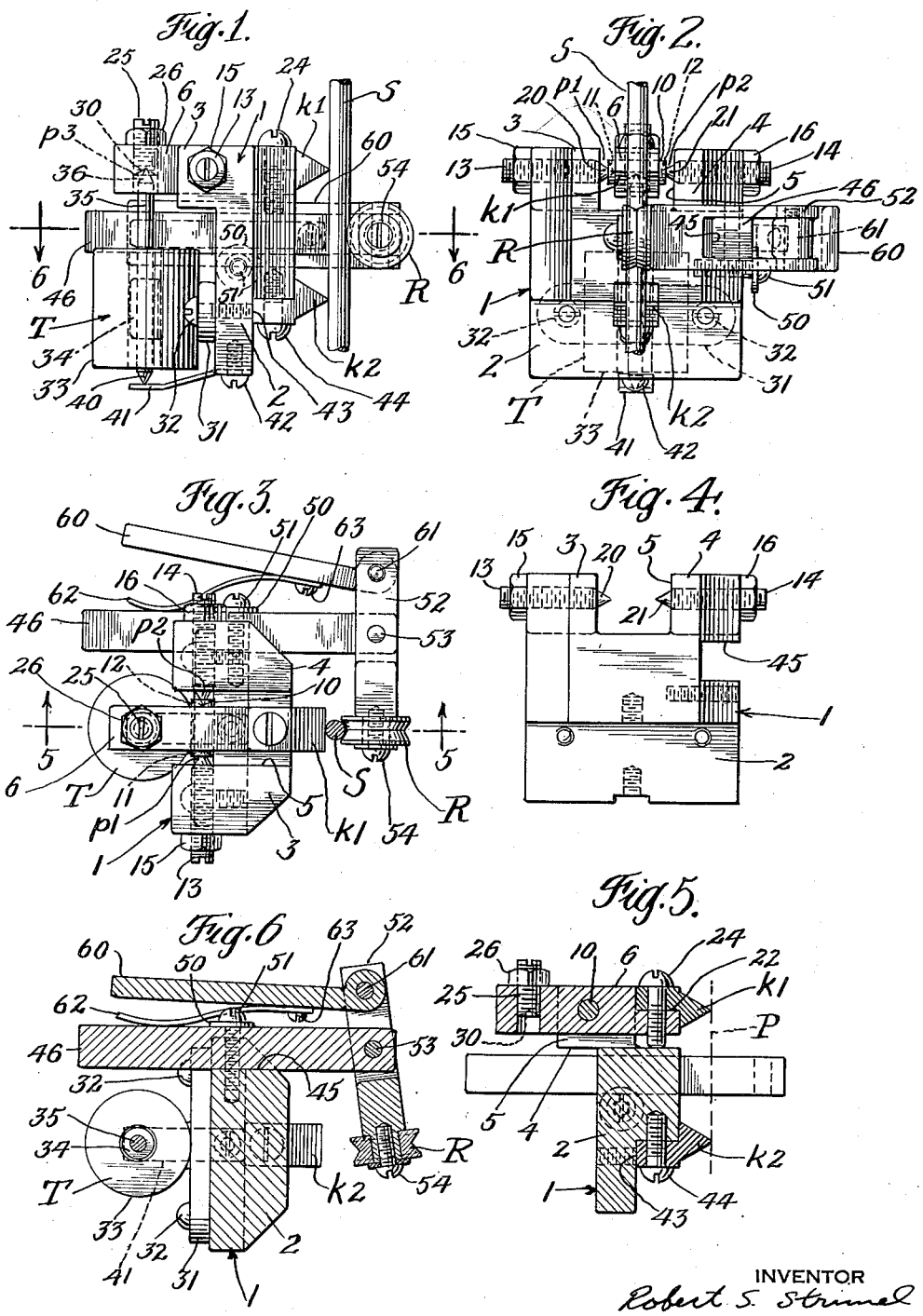

2,767,476

INSTRUMENT FOR STRAIN TESTING

Robert S. Strimel, Penllyn, Pa., assignor to Tinius Olsen Testing Machine Company, Willow Grove, Pa., a corporation of Pennsylvania Application August 29, 1955, Serial No. 531,121

3 Claims. (Cl. 33—148)

This invention relates to materials testing equipment and, in particular, relates to instrumentation for measuring the elongation or strain of a specimen to be tested in tension.

In the tension testing of a specimen of metal or plastic or the like, the specimen is secured in grips between the crossheads of a testing machine and strained by causing one crosshead to move relative to the other. The present invention is concerned with an instrument to be clamped on the specimen and operative to automatically measure the strain and to provide an electrical coil signal for apparatus to record the same, for example, a recorder as disclosed in my copending application, Serial No. 261,239, filed December 12, 1951, and entitled Recording Device for Use in Conjunction with Testing machines. An instrument of the kind in question is commonly called an "extensometer" in the art.

In general, the invention contemplates an extensometer comprising a main body or frame carrying a differential transformer, a fixed and a movable knife edge, the movable edge being arranged to move the core of the transformer together with a spring-loaded roller adapted to engage a specimen to be tested and hold or clamp the same against the knife edges.

There are several important features of the invention, and among these are:

A mounting for the roller providing for the same to be moved toward and away from the knife edges so as to accommodate specimens of different sizes, the arrangement including a spring adapted to push the roller against a specimen, the spring being arranged so that regardless of the adjusted position of the roller, the clamping force remains constant.

Another feature of the invention is that the interconnection between the movable knife edge and the transformer core includes a pivot which enables the movements of the knife edge and the core to be substantially linear with respect to one another.

Another feature of the invention is that the pivotal interconnection between the transformer core and the movable knife edge provides for the core to very accurately follow the motion of the knife edge.

Another feature of the invention is that the various components thereof are so constructed and arranged that the device can be made in an extremely small size.

The manner in which the foregoing features are accomplished and other features of the invention will be apparent from the following description and drawings wherein:

Figure 1 is a side elevational view of the device as connected to a test specimen;

Figure 2 is an end view looking toward the left in Figure 1;

Figure 3 is a plan view of Figure 1;

Figure 4 is a detailed view of the frame or body of the device;

Figure 5 is a section taken on the line 5—5 of Figure 3 with certain parts omitted; and Figure 6 is a plan section taken on the line 6—6 of Figure 1 showing the device in unclamped position.

In general, the device includes two knife edges $k{-}1$ and $k{-}2$ which are adapted to engage a test specimen S and be held firmly against the specimen by a pressure roller R. The upper or movable knife edge $k{-}1$ is interconnected to a transformer T, which is also part of the extensometer. As a specimen is stressed in tension, the upper knife edge $k{-}1$ follows the elongation and this motion is imparted to the transformer to produce a signal usable in the recording apparatus of my above-mentioned application.

With reference to Figures 1 and 4, it will be seen that the extensometer has a main body or frame 1 comprising a downwardly extending portion 2 together with two upper portions 3 and 4 which are arranged to form an elongated channel 5. Disposed within the channel 5 is a lever arm 6 which carries the knife edge $k{-}1$. Within the lever arm 6 is an insert 10 (see Figure 2), the ends of which are conically-shaped as indicated by the dotted lines 11 and 12. The upper portions 3 and 4 respectively carry screws 13 and 14, which may be adjusted in the upper portions and locked in place by the nuts 15 and 16. The ends of the screws are conically-shaped as is indicated at 20 and 21, and these conically-shaped portions mate with the conically-shaped portions 11 and 12 of the insert 10 to respectively form the pivots $p{-}1$ and $p{-}2$. With this arrangement, the lever arm 6 can swing or tilt within the channel 5.

As best seen in Figure 5, the lever arm 6 has a shoulder 22 which carries the knife edge $k{-}1$ secured thereon by the screw 24. The other end of the lever arm 6 carries a screw 25, which is axially adjustable in the lever and adapted to be locked in adjusted position as by the nut 26. The end of the screw 25 is conically-shaped as is indicated by the dotted lines 30.

Referring back to Figures 1 and 2, it will be noted that the body portion 2 carries a bracket 31 secured thereon by the screws 32—32 and the bracket mounts the housing 33 of the transformer T. The coils (not shown) of the transformer are enclosed within the housing together with a core element 34, the core being secured to a rod 35.

The upper end of the rod 35 is conically-shaped, as indicated by the numeral 36. This conical end mates with the conically-shaped portion 30 of the lever arm 6 to form a pivotal connection $p{-}3$ as between the rod and the lever arm. The lower end of the rod 36 is also conically-shaped as indicated at 40 and is supported by a spring 41, fixed by a screw 42, threaded in the body portion 2.

Ordinarily the spring 41 has a small hole accommodating the tip of the conically-shaped portion 40 so as to provide for sure and positive engagement.

The spring 41 tends to push the rod upward, hence, urge the lever in a clockwise direction. As best seen in Figure 1, the motion of the lever causes the screw 24 to bear on the body 1.

As seen in Figures 1 and 5, the body portion 2 has a shoulder 43 in which is mounted the knife edge $k{-}2$, the edge being fixed to the body by the screw 44. The tips of the two knife edges $k{-}1$ and $k{-}2$ lie in the same vertical plane as indicated by the dotted line P. The gauge length or distance between the knife edge tips may be set by appropriately fixing the distance which the screw 24 extends downwardly from the lever arm 6.

As best seen in Figure 4, the body portion 2 is provided with a slot 45, and in this slot is disposed a bracket 46 (see Figures 1–3), which is adjustably held in the slot by the washer 50 adapted to be tightened up by the screw 51. It will be apparent that by loosening or tightening the screw, the bracket 40 may be moved along the slot 45 and then be set in some desired position.

The bracket 46 carries an arm 52 which is pivotally secured thereto by the pivot 53. The arm carries the roller R rotatably mounted in the arm and held in position by the screw 54. The other end of the arm 52 carries a lever 60 which is fixed to the arm by the screw 61. A spring 62 is secured to the lever by screw 63 and bears on the bracket 46. The action of the spring is to urge the roller arm against a specimen S so that the specimen will be firm against the knife edges $k-1$ and $k-2$.

As seen in Figure 6, the lever 60 can be moved toward the bracket 46 so that the roller R moves away from the knife edge. This is ordinarily accomplished by placing the thumb on the bracket and the forefinger on the lever and squeezing. Thus, it will be apparent that the foregoing arrangement provides a means for clamping the extensometer on a test specimen.

As mentioned above, the bracket 46 is adjustable, and it will be apparent that by adjusting the bracket, the roller may be made to assume a position closer or farther away from the plane of the knife edges. Thus, different size specimens may be easily accommodated. It will be observed that the spring 62 is interposed between the lever and the bracket. Thus, for any adjusted position of the roller with respect to the knife edges, the roller pressure developed by the spring remains constant.

I have found that the above-described pivotal interconnections $p-1$, $p-2$ and $p-3$ enable the core to very accurately follow the motion of the knife edge $k-1$ and to provide for linearity between the core and knife edge. This is very important from the standpoint of accuracy, particularly where the over-all size of an extensometer is small. In such extensometers, the arm length, i. e., the distance between $p-3$ and the point of contact of the knife edge $k-1$ and the specimen, may only be in the order of one inch, and it will be apparent that with such a small absolute length, the mechanical error in the linkage between the knife edge and the core must be kept to a minimum.

I claim:

1. An extensometer adapted to be attached to a test specimen comprising: a main frame having an elongated channel on the top thereof; a lever arm disposed in said channel and extending outwardly from either end thereof, one end of the lever having a knife edge and the other end being formed with a conical shape to provide one section of a pivot; interconnections between the lever and the main frame providing for the tilting of the lever in said channel; a second knife edge secured to said frame and extending outwardly whereby the tips of the two knife edges lie in the same plane; a transducer including coils fixed in said frame and a core having an elongated rod, one end of the rod being conically-shaped and engaging the conically-shaped portion of said lever; a spring connected between the frame and the core and tending to urge said conically-shaped portions into engagement; a bracket secured to said frame and an arm pivotally connected with said bracket; a lever fixed on said arm and extending generally in the direction of said bracket; a roller mounted on said arm and disposed generally interjacent said knife edges; and a spring interconnected between said lever and said bracket to normally urge the roller toward the plane of said knife edges.

2. An extensometer adapted to be attached to a test specimen comprising: a main frame having an elongated channel on the top thereof; a lever arm disposed on said channel and extending outwardly from either end thereof; pivot means interconnecting the lever and the frame including two conically-shaped portions in the lever and a pair of pins on said frame respectively projecting into said channel, each pin having a conically-shaped head, the heads respectively mating with said conically-shaped portions in the lever; a knife edge disposed on said lever; a second knife edge secured to said frame, and arranged to lie in a plane containing said first knife edge, the knife edges being adapted to be engaged by a test specimen; a roller disposed on said frame and adapted to engage a test specimen when the same is engaged with said knife edges; a mechanism interconnecting the roller with said frame including spring means providing for the roller to be normally urged against a test specimen to push the same against said knife edges and for the roller to be moved away from said knife edges.

3. An extensometer adapted to be attached to a test specimen comprising: a main frame; a lever arm disposed at the top of said frame and extending outwardly therefrom, one end of the lever having a knife edge and the other end having a screw, one end of which is conically-shaped; a pair of screws mounted on the top part of said frame, one end of each screw being conically-shaped; an insert mounted in said lever arm whose ends are conically-shaped and respectively mount the ends of said pair of screws whereby to provide a pivot for the tilting of the lever arm; a second knife edge secured to said frame and extending outwardly whereby the tips of the two knife edges lie in the same plane; a transducer including coils fixed on said frame and a core having an elongated rod, one end of the rod being conically-shaped and engaging the conically-shaped portion of said lever arm screw whereby to provide a pivotal connection as between the rod and the lever arm; a spring operatively interconnected between the frame and the rod and tending to urge the conically-shaped end of the rod and the conically-shaped end of said lever screw into engagement; a bracket mounted on said frame and extending outwardly therefrom; an arm pivotally connected to said bracket; a roller mounted on one end of said arm and disposed generally interjacent said knife edges; an operating lever fixed on the other end of said arm; and a spring operatively interconnected between said lever arm and said bracket providing for the roller to be urged against the test specimen to push the same against said knife edges.

References Cited in the file of this patent

UNITED STATES PATENTS 2,578,066   Hyde _____ Dec. 11, 1951

FOREIGN PATENTS 289,203   Great Britain _____ Apr. 26, 1928